R. E. HAMILTON.
SELF CLEANING TRACTOR WHEEL.
APPLICATION FILED APR. 27, 1916.
1,274,710.
Patented Aug. 6, 1918.
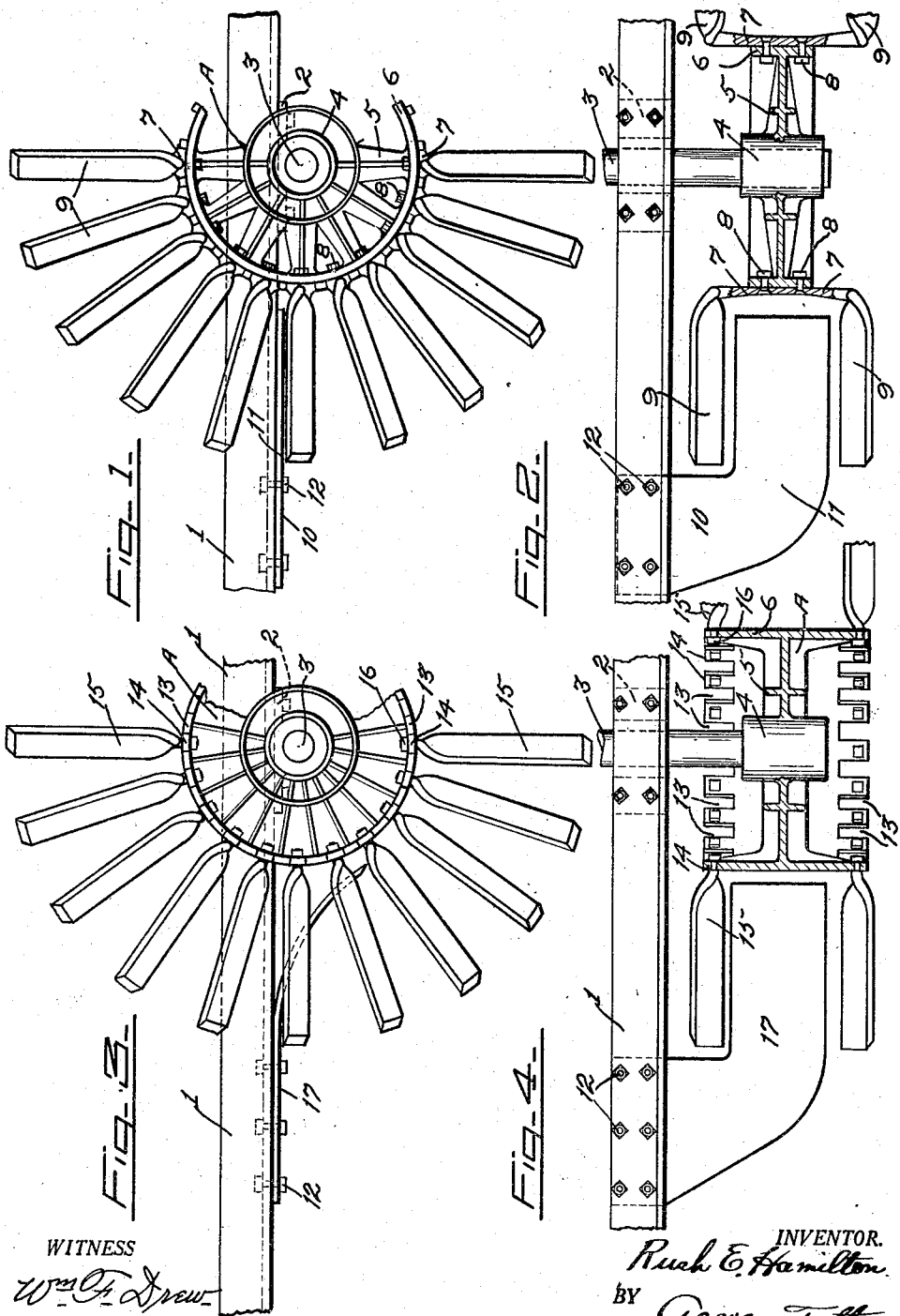

UNITED STATES PATENT OFFICE.

RUSH E. HAMILTON, OF GEYSERVILLE, CALIFORNIA, ASSIGNOR TO HAMILTON TRACTOR COMPANY, OF SAN FRANCISCO, CALIFORNIA, A CORPORATION OF CALIFORNIA.

SELF-CLEANING TRACTOR-WHEEL.

1,274,710. Specification of Letters Patent. Patented Aug. 6, 1918.

Application filed April 27, 1916. Serial No. 94,032.

*To all whom it may concern:*

Be it known that I, RUSH E. HAMILTON, a citizen of the United States, residing at Geyserville, in the county of Sonoma and State of California, have invented certain new and useful Improvements in Self-Cleaning Tractor-Wheels, of which the following is a specification.

The present invention relates to a self cleaning tractor wheel, and more particularly to that type of wheel adapted for use on farm tractors, where it is often necessary to operate on soft or plowed soil.

The invention has for its principal objects to provide a wheel having soil engaging prongs or spikes which provide tractor means and which are so arranged as to be self cleaning and to incorporate therewith a scraper or other cleaning instrument which will, on the revolving of the wheel, remove or shear therefrom the soil held between each pair of prongs or teeth. To provide a tractor wheel which is capable of being cleaned on each revolution thereof, one which may be manufactured at little cost and which is thoroughly efficient for the purpose designed.

To more fully comprehend the invention reference is directed to the accompanying drawings wherein—

Figure 1 is a partly broken view in side elevation of the preferred embodiment of my invention, illustrating the soil engaging blades, prongs or spikes and the scraper coöperating with the same.

Fig. 2 is a transverse sectional view of the structure illustrated in Fig. 1, disclosing more fully the position of the scraper relatively to the blades, prongs or spikes.

Fig. 3 is a modified form of structure when the blades, prongs or spikes are independently secured to the wheel felly and the scraper is curved.

Fig. 4 is a transverse sectional view of the structure illustrated in Fig. 3.

Referring more particularly to the several views of the drawings, wherein like characters of reference designate like parts, 1 indicates one of the side members of the supporting frame carrying the dolly box 2 beneath the same and in which is rotatably mounted the driving and wheel supporting axle 3. Mounted to rotate with the axle is the supporting wheel A consisting of the hub 4, web 5, and rim 6, preferably in the form of a unit casting but not necessarily so. To the periphery of the rim 6 are secured the tractor members which consist of the base portions 7, which extend transversely of the rim or felly and overhang the edges thereof, the same being detachably secured thereto by bolts or other suitable securing means 8. The parallel spaced soil engaging blades, prongs or spikes 9 are formed preferably integral with the ends of the base portions 7 and extend at right angles from the outer face thereof, and said blades are preferably twisted adjacent to their juncture with the base 7, so that the faces of the main portion of the blades lie at an angle of approximately 45 degrees to a line extending longitudinally through the center of the base and at an angle of 90 degrees to each other.

A plate 10 curved at its end, as at 11, to extend between the parallel spaced blades 9 as the wheel rotates is secured in any suitable manner, as by bolts 12, to the frame member 1. The end 11 of the plate provides a baffle or scraper for removing during the rotation of the wheel the clots of soil or other material which has lodged between or has otherwise been picked up by the transversely disposed pairs of blades on leaving the soil. Should soil or other material be picked up or become lodged between the prongs of adjacent pairs, the same will be forced longitudinally toward the base of the blades on the next insertion of the blades into the soil, this being made possible by extending the base of the blades beyond the sides of the wheel rim.

In the modified form of device illustrated in Figs. 3 and 4, the wheel rim 6 is recessed, as at 13, providing the outwardly extending portions 14, in each of which is received the base of a separate blade 15 which are retained in position by the nuts 16. The blades are preferably disposed with the faces at an angle of approximately 90 degrees, and in this illustration I employ a scraper or baffle 17 extending between the oppositely disposed blades and which is carried by the vehicle frame, the blade being downwardly curved to shear the soil or other material retained thereby from between the blades. By curving the scraper downwardly and rotating the wheel toward the underside thereof, I provide a self cleaning scraper which during the rotation of the wheel removes the soil or other material from between the blades of each pair.

In this construction, as in the preferred form, the inner ends of the blades are carried by a base which projects outwardly from the sides of the solid rim portion of the wheel rim and enables the material lodged between adjacent blades to be forced longitudinally thereof and freed therefrom on each insertion of the blades in the soil.

I have provided a tractor wheel wherein the soil engaging blades are arranged circumferentially of the rim thereof, and have arranged in coöperative relation between the rows a scraper or cleaning plate which is retained in a fixed position and which on the rotation of the wheel removes the soil lodged between the respective rows of blades and to enable the soil to be removed from the adjacent blades of the respective rows, by the insertion thereof in the soil on each revolution of the wheel, I have extended the base or supporting portions for the blades a distance beyond the side edges of the wheel rim.

While I have illustrated the preferred embodiment of my invention, it is to be understood that various changes in the form, proportion, size, and minor details of construction within the scope of the claims may be resorted to without departing from the spirit or sacrificing any of the advantages of the invention.

Having thus described my invention, what I claim as new and desire to protect by Letters Patent is:—

1. A self cleaning tractor wheel comprising a wheel structure having a series of recesses along each edge thereof, and a plurality of soil engaging blades carried thereby and arranged in spaced circumferential rows, one of said blades secured to the solid portion of said wheel rim projecting between each of said recesses.

2. A self cleaning tractor wheel, comprising a wheel structure formed with a series of recessed portions along each edge thereof, and a plurality of soil engaging blades arranged in parallel spaced circumferential rows, one of said blades being extended from the wheel structure projecting between each of said recesses, the end of said blades being so proportioned to the diameter of the wheel structure as to support the full load of the structure thereon.

3. A tractor wheel, comprising a wheel structure having a series of recesses along each edge thereof, a plurality of independently mounted radially disposed soil engaging blades associated therewith and arranged in rows circumferentially of said wheel structure, means for securing the respective blades of the rows to that portion of the wheel structure forming the side walls of said recesses, the distance between the ends of said blades and the point of intersection thereof with the wheel structure being greater than the distance between the wheel structure and the axis of its rotation, whereby the blades support the full load of the structure.

4. A tractor wheel comprising a wheel structure, a plurality of independently mounted radially disposed soil engaging blades carried thereby and arranged in spaced rows circumferentially of said wheel at points beyond the side edges of the main body portion of the wheel structure, the blades of each row being independent of adjacent blades or of corresponding blades of adjacent rows, and means for securing the inner ends of said blades to said wheel structure at a point beyond the side edge of the main body portion of the wheel structure.

In testimony whereof I have signed my name to this specification in the presence of two subscribing witnesses.

RUSH E. HAMILTON.

Witnesses:
 HARRY A. TOTTEN,
 D. B. RICHARDS.